United States Patent [19]

Kapadia

[11] Patent Number: 5,228,468
[45] Date of Patent: Jul. 20, 1993

[54] VALVE AND VALVE SEAT FOR FLAT VALVE AND METHOD OF MAKING SAME

[75] Inventor: Neville D. Kapadia, Davidson, N.C.

[73] Assignee: Ingersoll-Rand Company, Woodcliff Lake, N.J.

[21] Appl. No.: 894,131

[22] Filed: Jun. 4, 1992

[51] Int. Cl.⁵ .............................................. F16K 21/10
[52] U.S. Cl. ......................................... 137/1; 137/514; 137/855
[58] Field of Search ................... 137/514, 1, 527, 855, 137/856, 857, 858

[56] References Cited

U.S. PATENT DOCUMENTS

| | | | |
|---|---|---|---|
| 1,768,638 | 7/1930 | Sheats | 137/514 |
| 2,565,950 | 8/1951 | Crider | 137/514 |
| 2,754,844 | 7/1956 | Blackford | 137/514 |
| 3,037,523 | 6/1962 | Szaniszlo | 137/514 |
| 3,369,563 | 2/1968 | Deminger | 137/514 |
| 4,398,559 | 8/1983 | Bunn et al. | 137/514 X |
| 4,749,340 | 6/1988 | Ikeda et al. | 137/514 X |

*Primary Examiner*—John Rivell
*Attorney, Agent, or Firm*—Glenn B. Foster; Victor M. Genco, Jr.

[57] ABSTRACT

Flat valves, such as reed or disc face valves, have their seating motion damped by a plurality of discrete depressions formed either in the valve, in the valve seat surrounding a port, or both. The depressions may be formed by any number of inexpensive machining operations including drilling, pulse-laser machining or the like.

6 Claims, 2 Drawing Sheets

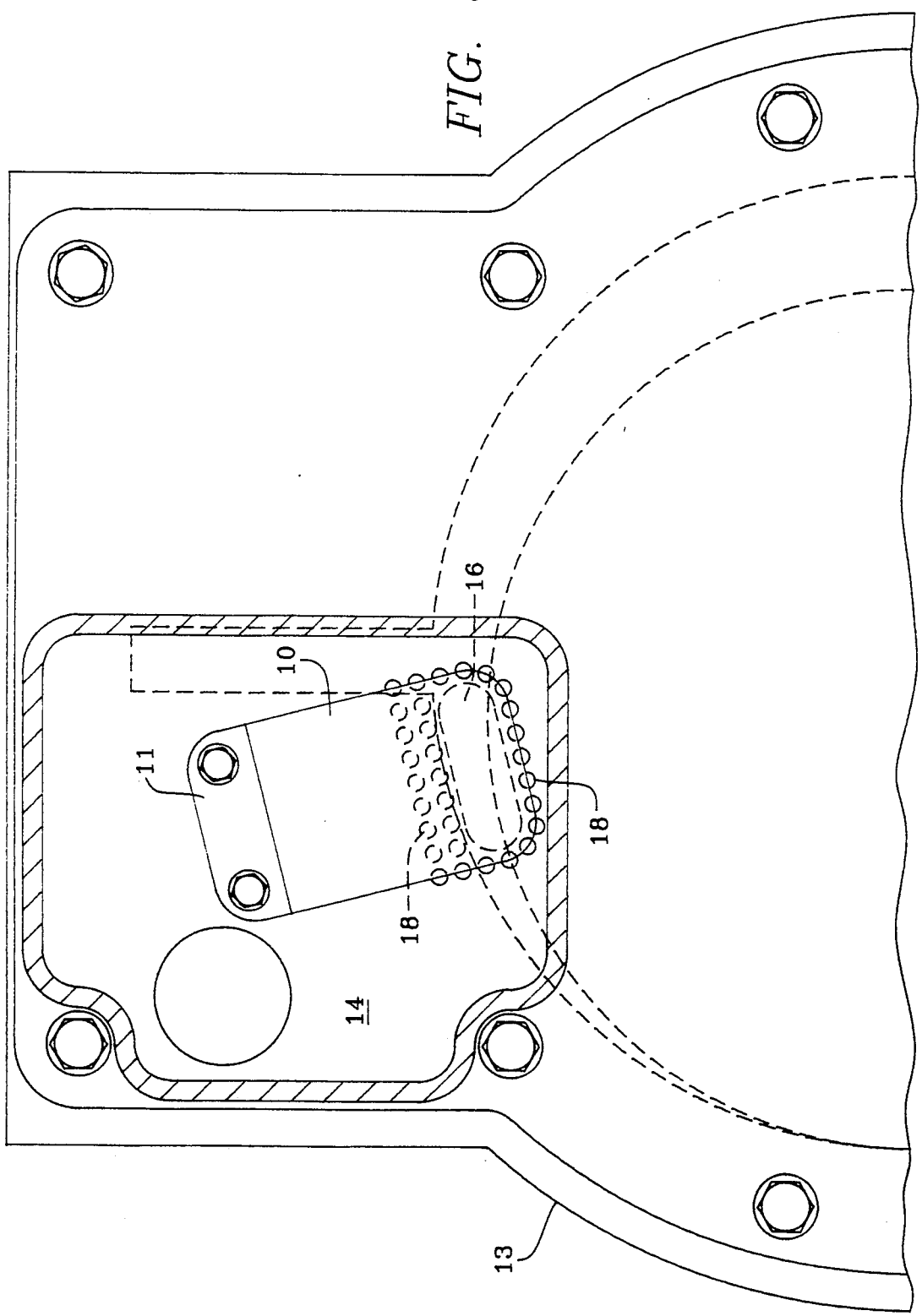

VALVE AND VALVE SEAT FOR FLAT VALVE AND METHOD OF MAKING SAME

BACKGROUND OF THE INVENTION

This invention relates to valves and valve seats for flat valves and a method of making the same; more particularly, the invention relates to rapidly acting flat valves seating against a valve seat that is parallel to the seating surface of the valve.

Typically, flat valves, such as disc face or reed valves, are characterized by a valve seating surface on the valve which is parallel to the surface of the valve seat when the valve is in its seated, or closed, position. Valves of this type find use, for example, in the discharge and a compressible fluid handling apparatus. In such environments the flat valves are repeatedly and rapidly actuated to seat and unseat themselves, i.e. to close and open. To ensure a good sealing action, the valve must rapidly and securely engage the surface of the valve seat. Rapidity of valve actuation and the firm contact required for effective valve closure leads, in certain applications, to premature wear of both the valve and its corresponding seat. Accordingly, the prior art has attempted to alleviate this problem by the formation of generally continuous grooves surrounding the port. These grooves function as plenum chambers to dampen the progress of the flat valve toward the valve seat and thereby minimize the contact shock between valve and seat.

The formation of grooves in a valve seat surrounding the port is a generally expensive process which becomes even more expensive when the port is in a shape other than circular. For example, if the shape of the port is a slot, as it might be in the case of a reed valve, complex computer numerically controlled machining operations become necessary to create the grooves.

The foregoing illustrates limitations known to exist in present valve and valve seat configurations. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing an improved valve seat for a flat valve wherein the valve seat is provided with an open port. The port is surrounded by a surface for the seating of the flat valve. A plurality of discrete depressions are formed in the surface surrounding the port to act as plenum chambers to damp the progress of the flat valve toward seating.

The foregoing and other aspects will become apparent from the following detailed description of the invention when considered in conjunction with the accompanying drawing figures.

BRIEF DESCRIPTION OF THE DRAWING FIGURE

FIG. 5 is a view illustrating a portion of a compressible fluid apparatus of the type using the valve and valve seat of the present invention.

DETAILED DESCRIPTION

Figure 1:
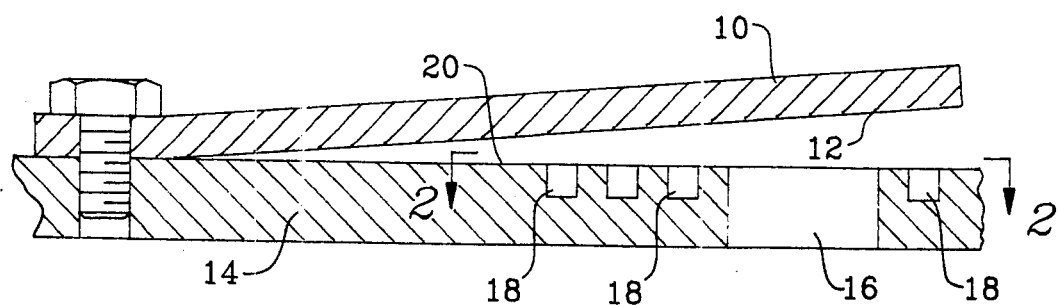
FIG. 1 is a partial, cross-sectional view illustrating an embodiment of an improved valve seat, which is disposed in an unseated or open position, and which is illustrated cooperating with a flat valve according to the invention.

With reference to FIGS. 1 and 5, there is shown a flat valve 10 having a seating surface 12. Flat valve 10 may, for example, be representative of a reed valve in which case it functions like a cantilever to flex about one of its ends 11 to repeatedly seat and unseat itself. A valve seat 14 has formed therein a substantially elongated, slot-shaped port 16. Additionally, a plurality of discrete depressions 18 are formed in a surface 20 of the valve seat 14. The combination of flat valve 10 and valve seat 14 may occur, for example, in a compressible fluid handling apparatus like an air compressor 13.

Figure 2:
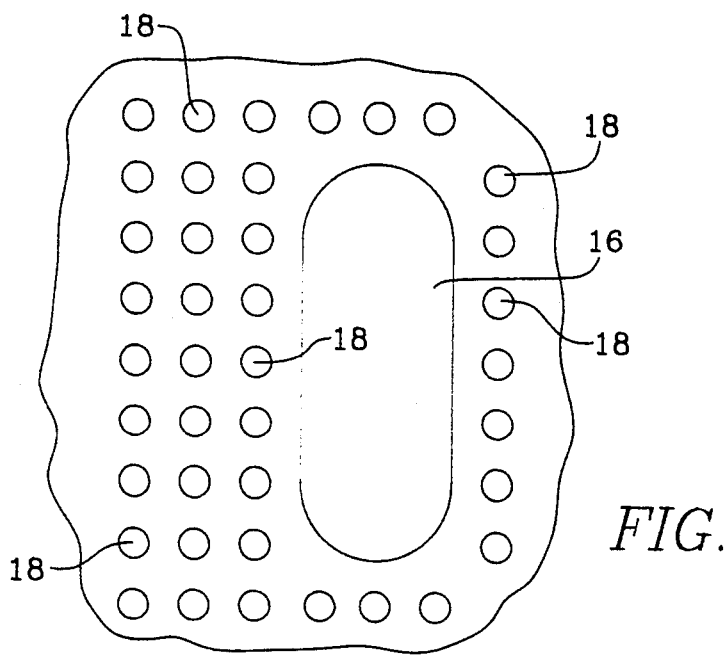
FIG. 2 is a view along the line 2-2 of FIG. 1.

As shown in FIG. 2, the discrete depressions 18 which are formed in the surface 20 of valve seat 14 are preferably small circular bores, or cylinders, which may be formed, e.g. by drilling.

Other methods of forming the depression 18 include casting, chemical etching, electro-discharge machining or any one of a number of similar manufacturing techniques such as electro-chemical or pulse laser machining. When other methods of forming the depressions are used, the shape of the depression may be other than circular.

As a result of the plurality of depressions, each of which functions as a miniature plenum chamber to reflect pressure pulses, the progress of valve 10 toward surface 20, is damped. The motion of valve 10, as it approaches surface 20 to seat itself thereon, will force a compressible fluid into the depressions 18 with a certain pressure and velocity. When the pressure pulse thus created is reflected from the bottom of depression 18, the reflection creates a localized region of turbulence whorl, i.e. high pressure, between the depression 18 and the valve 10 which serves to retard or damp the speed of the advancing valve 10. The depressions also function to greatly increase the surface area of the valve seat thereby contributing to an improved cooling of the valve seat.

Typical dimensions for the individual depressions 18 are individual diameters of 1.25 mm and individual depths of 2 mm. however, diameters as large as 6 mm, with depths as large as 7 mm have also been found to be satisfactory. In this regard, each application has its own set of optimized depression pitch, diameter and depth dimensions.

With reference to FIG. 2, it is noted that the depressions 18 are spaced around port 16 and are not spaced beyond the "footprint" of the seated valve, where they would not be useful. Also, as previously noted, when machining techniques other than drilling are employed to form the depressions 18, the depressions may be defined by geometric shaped bores other than circular bores. The underlying phenomena, however, would be the same as described with respect to the cylindrical depressions. Whatever the shape of the depressions, it is only desirable that each depression be generally similar in shape and volume to all the others to create a uniform retarding force over the entire seating surface 12 of valve 10, or if desired, a variable damping effect by varying individual depression geometry and volume. Sticture, which is the tendency of two uniformly smooth surfaces in contact with one another to stick together due to surface adhesion, is a major problem especially in reed valves where it can increase the pressure differential necessary to unseat the reed valve by a factor as much as three to five. To avoid this problem, the depressions 18 serve the additional function of creating discontinuities in the contact face between valve seating face 12 and valve seat surface 20. The discontinuities in the contact face lessen the forces causing sticture.

Figure 3:
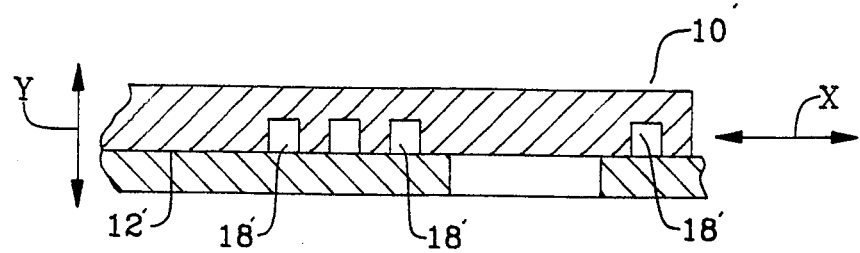
FIG. 3 is a partial, cross-sectional view illustrating another embodiment according to the invention which illustrates an improved valve.

With reference to FIG. 3, where parts similar in function to FIG. 1 have been numbered similarly but in primed notation, there is shown a flat valve 10' which has on the seating surface 12' thereof a plurality of discrete depressions 18' which function in a manner identical to the depressions 18 described as located in the valve seat surface 20 of FIG. 1. It is noted that preferably there are no depressions 18' located in a portion of the seating surface 12' which would be located opposite the port of the valve seat. In this area, depressions 18' are not necessary and only marginally useful. The improved flat valve 10' may take the form illustrated in FIG. 3 especially when flat valve 10' is of a type other than a reed valve which, because of it thinness, would generally not be suited for accepting in the seating surface thereof depressions, such as depression 18'. The placement of the depressions 18' may be eccentric across the sealing surface 12', as illustrated, or may be concentrically disposed thereacross, (not illustrated). The motion of the flat valve 10' may be in either the X or Y directions (as indicated by the directional arrows in FIG. 3) between a sealing and nonsealing position.

Figure 4:
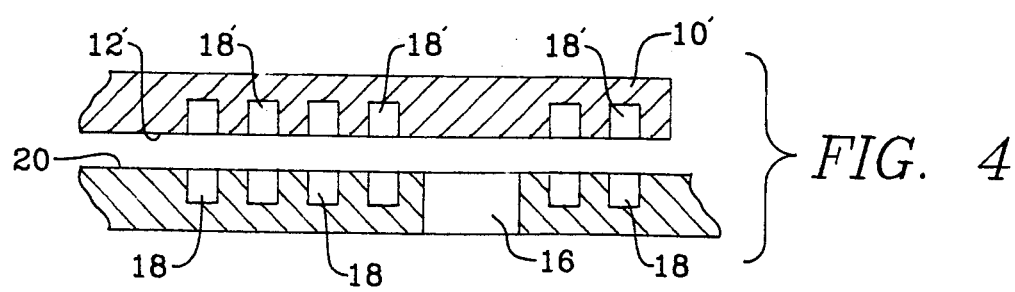
FIG. 4 is a partial, cross-sectional view illustrating another embodiment showing both an improved valve and valve seat according to the invention.

With reference to FIG. 4, there is shown a disposition between the improved valve seat shown in FIG. 1 and the improved valve 10' shown in FIG. 3. While the plurality of discrete depressions 18 and 18' formed respectively in the valve seat 14 and valve 10' are preferably aligned with one another, that need not be the case. Any assortment of discrete depressions 18 and 18' formed in both the valve seat 14 and the valve 10' are expected to produce results similar to those described previously in connection with FIG. 1, i.e. to damp the progress of valve 10' toward the seating surface 20 of valve seat 14.

While the invention has been particularly shown and described with reference to preferred embodiments thereof, it will be understood by those skilled in the art that the foregoing and other changes in form and details may be made therein without departing from the spirit and scope of the invention, as defined by the claims appended hereto.

Having described the invention, what is claimed is:

1. In a compressible fluid handling apparatus, the combination comprising:
   a first movable surface;
   a second stationary surface, said first surface movable toward said second surface; and
   a plurality of discrete bores formed in at least one of the first and second surfaces, each discrete bore having a generally similar shape and volume, the discrete bores acting as plenum chambers to damp the movement of said first surface toward said second surface.

2. A method for creating an improved valve seat for a flat valve comprising the steps of:
   creating a generally planar surface having formed therein a port; and
   forming around the port a plurality of discrete bores in the planar surface, each discrete bore having a generally similar shape and volume, the discrete bores acting as plenum chambers to damp the movement of said first surface toward said second surface.

3. Method for improving coaction between a moving flat valve and a stationary valve seat, the method comprising the steps of:
   creating a movable valve having at least a seating surface;
   creating a stationary valve seat with a contact surface adapted to contact said seating surface; and
   forming a plurality of discrete bores in at least one of said seating and contact surfaces, each discrete bore having a generally similar shape and volume.

4. In a fluid compressor, an apparatus for applying a uniform damping effect to a moveable valve member, the apparatus comprising:
   a flat valve having opposed first and second substantially planar surfaces, the flat valve operable for back and forth movement between first and second positions;
   a valve seat having a substantially elongated, slot shaped port formed therein, the elongated slot shaped port surrounded by a stationary seating surface, and wherein when the flat valve is disposed in the first position, the second valve surface is disposed in contact relation with the stationary surface; and
   a plurality of discrete bores each having a generally similar shape and volume capacity, the discrete bores being formed in a predetermined pattern on the stationary surface of the valve seat, the discrete bores acting as plenum chambers to damp the movement of the flat valve into the first position.

5. In a fluid compressor, an apparatus for providing a variable damping effect to a moveable valve member, the apparatus comprising:
   a flat valve having opposed first and second substantially planar surfaces, the flat valve operable for back and forth movement between first and second positions;
   a valve seat having a substantially elongated, slot shaped port formed therein, the elongated slot shaped port supported by a stationary seating surface, and wherein when the flat valve is disposed in the first position, the second valve surface is disposed in contact relation with the stationary surface; and
   a means for variably damping the flat valve into the first position, the variable damping means including a plurality of discrete, substantially circular shaped bores formed in a predetermined pattern on the stationary surface of the valve seat, and wherein each discrete, circular shaped bore has a predetermined shape and volume capacity, the discrete circular shaped bore acting as plenum chambers to variably damp the progress of the flat valve toward the first position.

6. In a compressible fluid handling apparatus, an apparatus comprising:
   a first movable surface;

a second stationary surface, said first surface movable toward said second surface; and a means for variably damping the first movable surface toward the second surface, the variable damping means including a plurality of discrete, substantially circular shaped bores formed in a predetermined pattern on one of the first or second surfaces, and wherein each discrete, circular shaped bore has a predetermined shape and volume capacity, the discrete circular shaped bores acting as plenum chambers to variably damp the progress of the first surface toward the second surface.

* * * * *